US010001639B1

(12) United States Patent
Guntaka et al.

(10) Patent No.: US 10,001,639 B1
(45) Date of Patent: Jun. 19, 2018

(54) BRICK TYPE COLORED PIXEL WALL FOR ELECTROWETTING DISPLAYS

(71) Applicant: Amazon Technologies, Inc., Seattle, WA (US)

(72) Inventors: Tulasi Sridhar Reddy Guntaka, Eindhoven (NL); Karel Johannes Gerhardus Hinnen, Eindhoven (NL); Gor Manukyan, Veldhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 15/067,258

(22) Filed: Mar. 11, 2016

(51) Int. Cl.
  *G02B 26/02* (2006.01)
  *G02B 26/00* (2006.01)
  *G02B 5/20* (2006.01)

(52) U.S. Cl.
  CPC ........... *G02B 26/005* (2013.01); *G02B 5/201* (2013.01)

(58) Field of Classification Search
  CPC .... G02B 26/004; G02B 26/005; G02B 5/201; G02B 2207/15; G02F 1/133514; G02F 1/133516; G02F 1/133609; G02F 1/133617; G02F 1/13394; G02F 2001/13398; G02F 1/134309; G02F 1/13439

USPC .............. 359/228, 242, 265, 267, 290, 296; 345/105–107
  See application file for complete search history.

(56) References Cited

U.S. PATENT DOCUMENTS 6,281,960 B1 * 8/2001 Kishimoto ........ G02F 1/133377
  349/110

\* cited by examiner

*Primary Examiner* — Euncha Cherry
(74) *Attorney, Agent, or Firm* — EIP US LLP

(57) ABSTRACT

An electrowetting display comprises a support plate on which individual electrowetting pixels separated from one another by pixel walls are formed. Pixel walls including different layers are disposed on the first support plate and separate adjacent pixel regions from each other. The first layer of a pixel wall comprises a first material having a first color and a second layer of the pixel wall comprises a second material having a second color that is different from the first color. Instead of using black matrix to reduce photo crosstalk, the pixel walls of the different layers absorb light colors that are not intended to reach the respective pixels. A fluid is disposed between the first support plate and a second support plate and at least partially surrounds the first wall and the second wall.

20 Claims, 11 Drawing Sheets

BRICK TYPE COLORED PIXEL WALL FOR ELECTROWETTING DISPLAYS

BACKGROUND

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

In some examples, pixel walls may be substantially transparent so as to transmit a wide portion of the visible part of the electromagnetic (EM) spectrum. Such transmission may allow light to pass through pixel walls from one pixel to adjacent pixels. Generally, adjacent pixels correspond to colors that are different from one another (e.g., a red pixel adjacent to a blue pixel adjacent to a green pixel, and so on). Light transmitted through pixel walls may contribute to photo crosstalk between the adjacent pixels. In an attempt to reduce this crosstalk between the adjacent pixels, an opaque patterned layer called a black matrix (BM) may be located on a top color filter plate to absorb and selectively block light and decrease photo crosstalk.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various examples described herein, electronic devices include electrowetting displays for presenting content and other information. According to some examples, instead of using transparent pixel walls or pixel walls of a single color, pixel walls comprise different colored layers. For example, a pixel wall may include a red layer, a green layer, and a blue layer. In other examples, a pixel wall may include different colors and/or a different number of layers.

Pixel walls that include multiple layers and are colored differently, may be referred to herein as a "brick type pixel wall". A brick type pixel wall may reduce photo crosstalk, as compared to structures having non-colored pixel walls or solid-colored pixel walls. Display color uniformity may also be enhanced by tuning saturation of each color or the ratio between areas of each of three colored layers within the pixel wall.

According to some examples, a black matrix material is not used as a light shield to minimize off state reflectance from the reflector plane. Instead, in some examples, a color filter of one pixel can extend to (and possibly be in direct contact with) the color filter of an adjacent pixel. As such, more light may be allowed to enter the pixels as compared to pixels that utilize a black matrix material. These brick type pixel walls can be formed with colored (R, G, B, or other colors) photo definable material help to block light passage toward a reflector plane and improve display contrast.

In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various examples described include techniques for assembling electronic devices including these components for the electrowetting displays and other features described herein.

Figure 1:
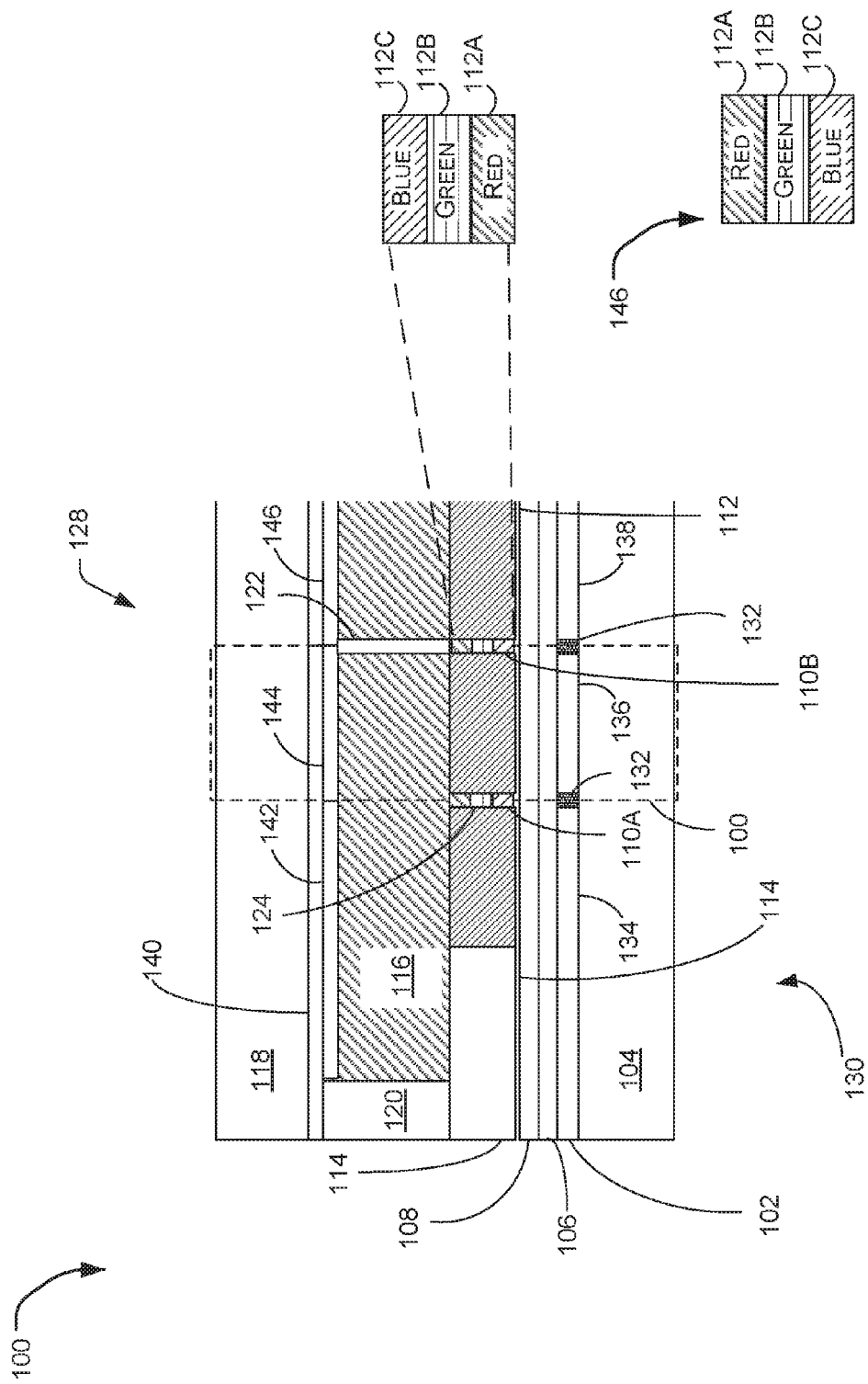
FIG. 1 is a cross-section of a portion of an electrowetting display device, according to some examples.

FIG. 1 is a cross-section of a portion of a reflective electrowetting display device illustrating several electrowetting pixels 100, according to some examples. Though three such electrowetting pixels are illustrated, an electrowetting display device may include any number (usually a very large number, such as thousands or millions) of electrowetting pixels. An electrode layer 102 is formed on a first (e.g., bottom) support plate 104 and may comprise one or more individual electrodes in each electrowetting pixel.

In various examples, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel wall 110A and pixel wall 110B, collectively referred to as "110", form a patterned electrowetting pixel grid on hydrophobic layer 108. Pixel walls 110 may comprise two or more layers of one or more photoresist materials such as, for example, epoxy-based negative photoresist SU-8. In other examples, a positive photoresist can be utilized. Each of the two or more layers are colored differently (e.g., one layer red, one layer blue, one layer green).

In detail, pixel walls 110 comprise adjacent and mutually contacting portions (e.g., horizontal layers) that each have colors different from one another, as described below. Thus, for example, pixel walls 110A and 110B that surround pixel 100 are illustrated as having three different colored layers. In the current example, the pixel walls 110A and 110B have a blue top layer 112C, a green middle layer 112B, and a red bottom layer 112. Each adjacent layer is in contact with another layer in the pixel wall 110. Other colors may be used for the different layers. For example, a pixel wall may be formed from a red top layer 112A, a green middle layer 112B, and a blue bottom layer 112 as illustrated by element 146. In other examples, the layers may be formed in any combination or from red, green, blue, yellow, as well as other colors.

The patterned electrowetting pixel grid comprises rows and columns that form an array of electrowetting pixels. For example, an electrowetting pixel may have a width and length in a range of about 50 to 500 microns. Each of the layers may be a predetermined height. For example, each layer in a pixel wall may be the same height as an adjacent layer and/or a different height. In some implementations, the pixel walls need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second (e.g., top) support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 may extend from tops 124 of pixel walls 110 to second support plate 118. Spacer grid array 122 and pixel walls may be substantially aligned with one another.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some examples, electrowetting pixels may include a second electrode 140 disposed on second support plate 118, and color filters 142, 144, and 146 over individual pixels.

The electrode on the second support plate may or may not be patterned to form any of a number of circuit configurations, for example.

In some examples, color filters of adjacent pixels may have different colors. Thus, for example, color filter 142 may be red, color filter 144 may be green, and color filter 146 may be blue. In such an example, the left-most illustrated pixel may be a red pixel, the middle pixel may be a green pixel, and the right-most illustrated pixel may be a blue pixel.

Hydrophobic layer 108 is arranged on first (e.g., bottom) support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible EM spectrum, making the layer appear white, or part of it, making it have a color.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
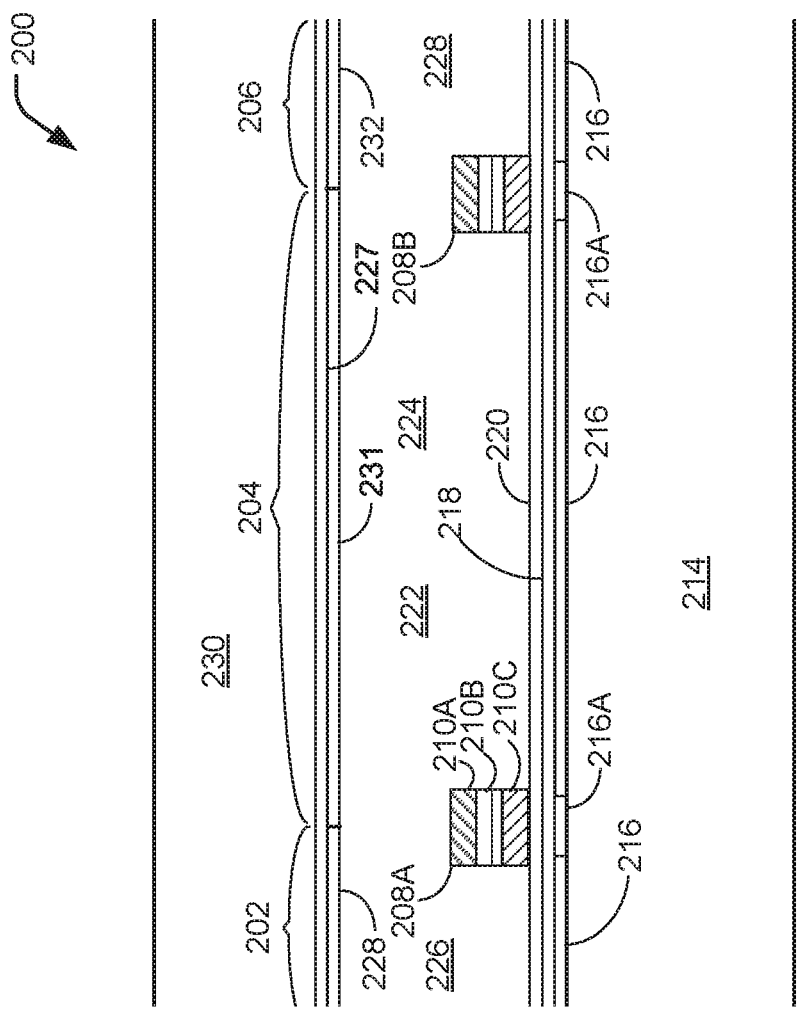
FIG. 2 is a cross-section view of electrowetting pixels, according to some examples.

FIG. 2 illustrates a cross-section view 200 of electrowetting pixels, according to some examples. In particular, view 200 illustrates a portion of a pixel region 202, a pixel region 204, and a portion of pixel region 206. Pixel region 202 is bordered by a pixel wall 208 having layers of different colors. As illustrated, the pixel wall has a red layer 210A, a green layer 210B, and a blue layer 210C. As discussed above, the layers may be arranged in different orders (e.g., blue, green, red, or green, red, blue). Further, fewer or more layers may be included in a pixel wall. For instance, a pixel wall may include two layers whereas another pixel wall includes four layers.

An object "having a color" may indicate that the object comprises a material of that color. For example, a pixel wall having a color of "red" comprises a material that transmits a particular portion of the optical spectrum corresponding to the color red. Thus, the material may appear to be the color and substantially transmit the color. A pixel or pixel region "having a color" means that the pixel or pixel region is configured to produce the color as a pixelated portion of an image. The pixel or pixel region may be covered by a color filter comprising a material that transmits a particular portion of the optical spectrum corresponding to the color. In other configurations, such a colored filter may be located in another part of the pixel or pixel region (e.g., on a bottom support plate).

Pixel regions 202-206 may be located on a support plate 214, which may be substantially flat, and may include, among other things, a conductive layer 216 (e.g., an electrode layer), a dielectric barrier layer 218, and an AF layer 220 at least partially covering the dielectric barrier layer. The conductive layer, dielectric barrier layer, and the AF layer may be formed or otherwise disposed on support plate 214. For a particular example, dielectric barrier layer 218 may comprise SiN, SiON, SiO, or TaO, just to name a few examples, and may have a thickness in a range from about 100 nanometers up to about 500 nanometers. In some implementations, the dielectric barrier layer may comprise a multilayer structure that includes organic and inorganic sublayers. An organic layer may comprise polyamide, for example. An organic layer may have an insulating property higher than that of an inorganic layer so as to reduce the amount of leakage current between conductive layer 216 and a fluid portion 222, for example.

In some examples, pixel walls 208 may be disposed directly on AF layer 220. In other examples, pixel walls 208 may be disposed directly on conductive layer 216 or dielectric barrier layer 218. Thickness of conductive layer 216 may be in a range from about 200 nanometers up to about 300 nanometers. In substantially the same plane as conductive layer 216, an insulative material or dielectric material 216A may be located between adjacent portions of conductive layer 216. Fluid portion 222, which may comprise one or more different fluids that are immiscible with one another, may cover the stack of conductor(s) and dielectric(s) 216, 218, and AF layer 220. In some examples, fluid portion 222 may be considered to include a first portion 224 comprising fluid portion 222 between pixel walls 210 of pixel region 204, include a second portion 226 comprising fluid portion 222 to the left (in the figure) of pixel wall 208 of pixel region 202, and include a third portion 228 comprising fluid portion 222 to the right (in the figure) of pixel wall 208B of pixel region 206, for example.

A top support plate 230 may be located over fluid portion 222, overlaying the structure (e.g., pixel walls, conductive layer, hydrophobic layer, and so on) disposed on bottom support plate 214. A top electrode layer 227 and color filters 228, 231, 232 may be disposed on top support plate 230. Each color filter may be disposed over individual pixel regions. For example, color filter 228 may be placed in or over pixel region 202 so that substantially all light entering pixel region 202 travels through color filter 228. Similarly, color filter 231 may be placed in or over pixel region 204 so that substantially all light entering pixel region 204 travels through color filter 231, and color filter 232 may be placed in or over pixel region 206 so that substantially all light entering pixel region 206 travels through color filter 232.

Figure 3:
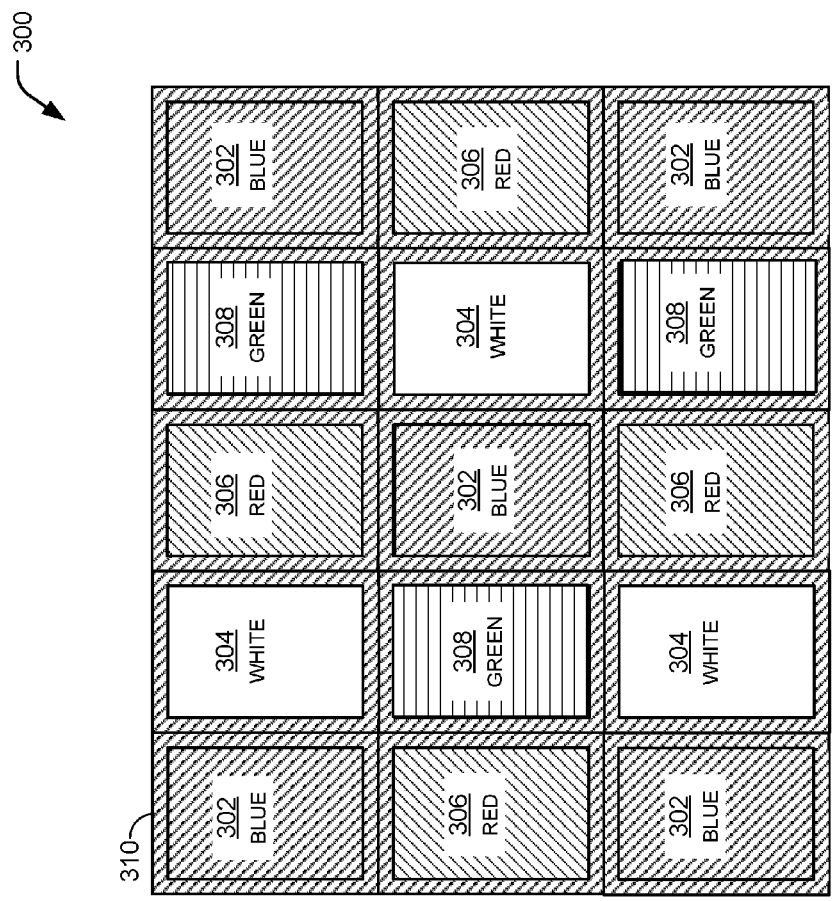
FIG. 3 is a top view of an array of electrowetting pixels, according to some examples.

FIG. 3 illustrates a top view of an array 300 of colored electrowetting pixel regions, according to some examples. Such an array 300 is merely a portion of a larger array of pixel regions. In this particular example, pixel array 300 includes red (R), green (G), blue (B), and white (W) pixel regions in an RGBW configuration. Of course, array 300 may include any of a number of color configurations, including other colors, and claimed subject matter is not limited in this respect. For example, pixel regions 302 are blue, pixel regions 304 are white, pixel regions 306 are red, and pixel regions 308 are green. Accordingly, blue pixel regions 302 may include a blue color filter, white pixel regions 304 may include a clear (or no) color filter, red pixel regions 306 may include a red color filter, and green pixel regions 308 may include a green color filter, and. Herein, "clear" indicates a substantially transparent material, in contrast to a colored material, such as a red, green, or blue colored material. In the current example, each of the pixel regions is surrounded by a brick type pixel wall 310 that includes two or more layers of different colors.

FIGS. 4A-4D are cross-section views of electrowetting pixel regions including sample light rays for describing behavior or light as the light enters the pixel. Pixel region 400 includes a hydrophobic layer 408. In some examples, the hydrophobic layer is located a on dielectric barrier layer that is above a conductive layer that is disposed on a bottom support plate (not shown).

Figure 4A:
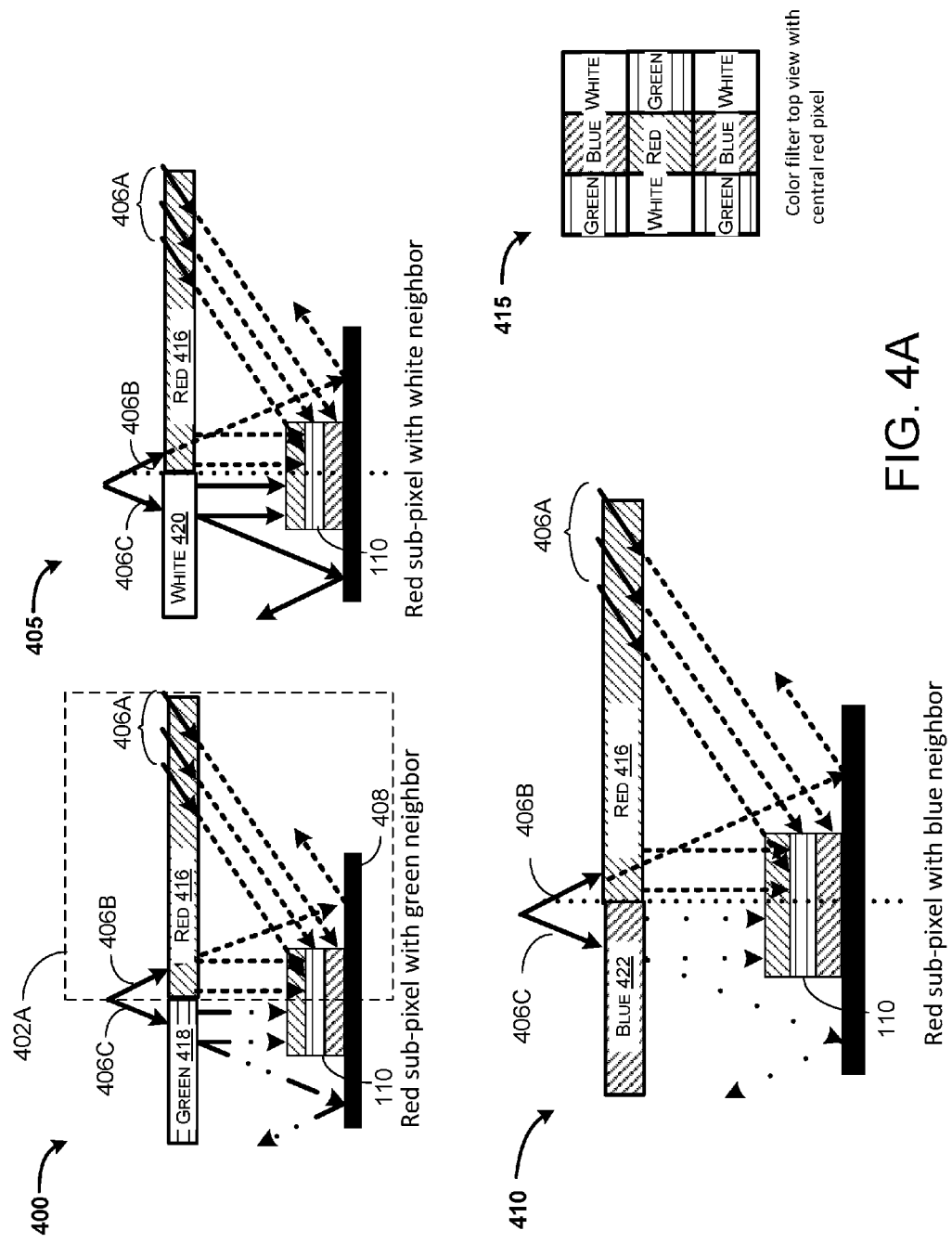
FIGS. 4A, 4B, 4C, and 4D are cross-section views of an electrowetting pixel and light rays, according to some examples.

FIG. 4A shows a central red sub-pixel with a green neighbor, a white neighbor, and a blue neighbor. Referring now to element 400, a red pixel region (as indicated by dashed line 402A) includes a pixel wall 110 that has three layers (e.g., red, green, blue) arranged as a brick type pixel wall. The neighboring pixel region left of red pixel region 402A is a green pixel region. Pixel region 402 includes a red color filter 416, the neighboring pixel region left of pixel region 400 includes a green color filter 418. Element 415 shows a top view of an arrangement of color filters over pixel regions that include a central red pixel. For sake of explanation, a particular example is considered where the colors include red, green, blue, and white.

Generally, upon transmission, a color filter absorbs and/or reflects substantially all but a particular color of white light. In some examples, a red color filter may transmit light in a wavelength range having peak transmission (e.g., about 90% or 95%) at about 670 nm. A green color filter may transmit light in a wavelength range having peak transmission at about 520 nm. A blue color filter may transmit light in a wavelength range having peak transmission at about 460 nm. While specific wavelengths are described, other wavelengths can be utilized.

For example, light rays 406A and 406B represents white light impinging upon red pixel region 402 at different angles of incidence. White light is a broad spectrum of the visible portion of the EM spectrum having wavelengths ranging from about 400 nanometers (nm) to about 700 nm. Subsequent to transmission through red color filter 416, the resulting light rays (as indicated by dashed lines to indicate red light) comprise red light without green and blue light (the green and blue colors of the original light rays 406A-406B having been absorbed and/or reflected). Red light rays can transmit through a red pixel wall layer in pixel wall 110, but may not penetrate into or transmit through the other pixel wall layers of different colors. Thus, a red light ray is at least partially absorbed by a blue pixel wall layer and/or a green pixel wall layer. The red light ray resulting from the transmission of light ray 406B through red color filter 416 is at least partially reflected from a reflecting portion of an electrowetting display.

Light ray 406C represents white light impinging upon green pixel regions at different angles of incidence. Subsequent to transmission through the color filter 418, the resulting light rays (as indicated by dotted and dashed lines to indicate green light) comprise green light without red and blue light (the red and blue colors of the original light ray 406C having been absorbed and/or reflected). Green light rays can transmit through a green pixel wall layer in pixel wall 110, but may not penetrate into or transmit through the other pixel wall layers of different colors. Thus, a green light ray is at least partially absorbed by a blue pixel wall layer and/or a red pixel wall layer. The green light not hitting the pixel wall 410 may be reflected from a reflecting portion of an electrowetting display.

A number of desirable features exist. One such feature is that TFT circuitry that may be connected to an electrode layer (e.g., 102) may be protected from stray light. In particular, in some examples, TFT circuitry may be below or in close proximity to pixel walls. Light impinging on such TFT circuitry may generate photo-current that may adversely affect operation of the electrowetting display and contribute to crosstalk among the pixel regions. However, pixel walls colored in coordination with the colors of overlaying color filters, as described herein, for example, shield the TFT circuitry from the stray light, and photo-current is thus reduced or substantially eliminated. Another such desirable feature is that the different colored layers of the pixel wall 110 prevent light from reaching another pixel region. Thus, photo crosstalk between the different pixel regions is substantially avoided.

In another example, the red pixel region 402A is adjacent to a white pixel region as indicated by element 405. The transmission, absorption and reflection of the light rays 406 is similar to the transmission, absorption and reflection as illustrated by element 400. In the example illustrated by element 405, the white light is absorbed by the pixel wall 110 and/or reflected. In yet another example, the red pixel region 402A is adjacent to a blue pixel region as indicated by element 410. The transmission, absorption and reflection of the light rays 406 is similar to the transmission, absorption and reflection as illustrated by element 400. In the example illustrated by element 410, the white light is absorbed by the pixel wall 110 and/or reflected.

Figure 4B:
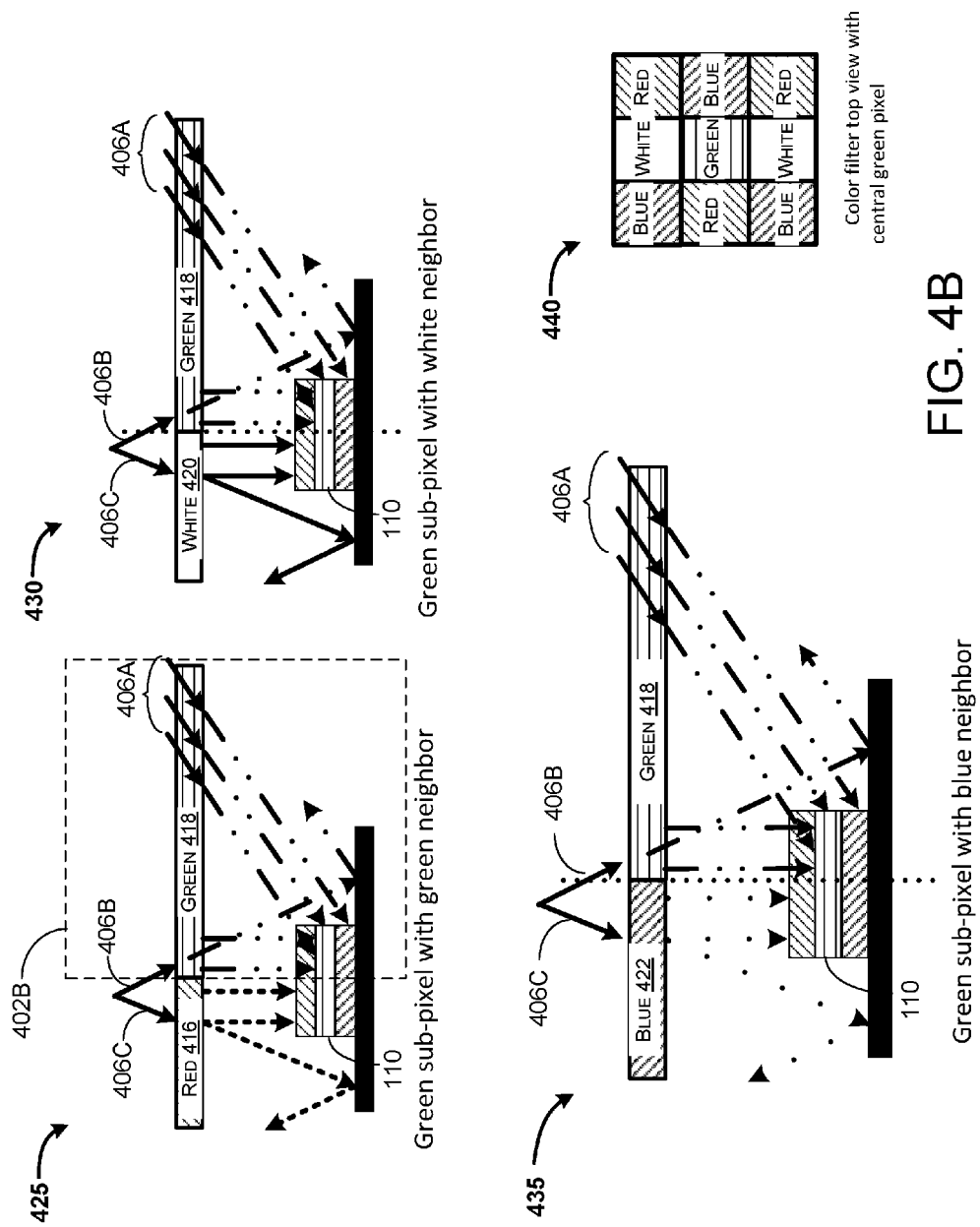

FIG. 4B shows a central green sub-pixel with a red neighbor, a white neighbor, and a blue neighbor. Referring now to element 425, a green pixel region (as indicated by dashed line 402B) includes pixel wall 110 that has three layers (e.g., red, green, blue) arranged as a brick type pixel wall. The neighboring pixel region left of the green pixel region is a red pixel region. Pixel region 402B includes a green color filter 418, and the neighboring pixel region left of pixel region 402B includes a red color filter 418. Element 440 shows a top view of an arrangement of color filters over pixel regions that include a central green pixel.

In the examples illustrated in FIG. 4B, light rays 406A and 406B represents white light impinging upon green pixel region 402B at different angles of incidence. Subsequent to transmission through the green color filter 418, the resulting light rays (as indicated by dashed and dotted lines to indicate green light) comprise green light without red and blue light (the red and blue colors of the original light rays 406 having been absorbed and/or reflected). Green light rays can transmit through a green pixel wall layer in pixel wall 110, but may not penetrate into or transmit through the other pixel wall layers of different colors. Thus, a green light ray is at least partially absorbed by a blue pixel wall layer and/or a red pixel wall layer. The green light ray resulting from the transmission of light ray 406B through the green color filter 418 is at least partially reflected from a reflecting portion of an electrowetting display.

Light ray 406C represents white light impinging upon red pixel regions at different angles of incidence. Subsequent to transmission through the red color filter 416, the resulting light rays (as indicated by dotted lines to indicate red light) comprise red light without green and blue light (the green and blue colors of the original light ray 406C having been absorbed and/or reflected). Red light rays can transmit through a red pixel wall layer in pixel wall 110, but may not penetrate into or transmit through the other pixel wall layers of different colors.

In another example, the green pixel region 402B is adjacent to a white pixel region as indicated by element 430. The transmission, absorption and reflection of the light rays 406 is similar to the transmission, absorption and reflection as illustrated by element 425. In the example illustrated by element 430, the white light is absorbed by the pixel wall 110 and/or reflected. In yet another example, the green pixel region 402B is adjacent to a blue pixel region as indicated by element 435. The transmission, absorption and reflection of the light rays 406 is similar to the transmission, absorption and reflection as illustrated by element 425.

Figure 4C:
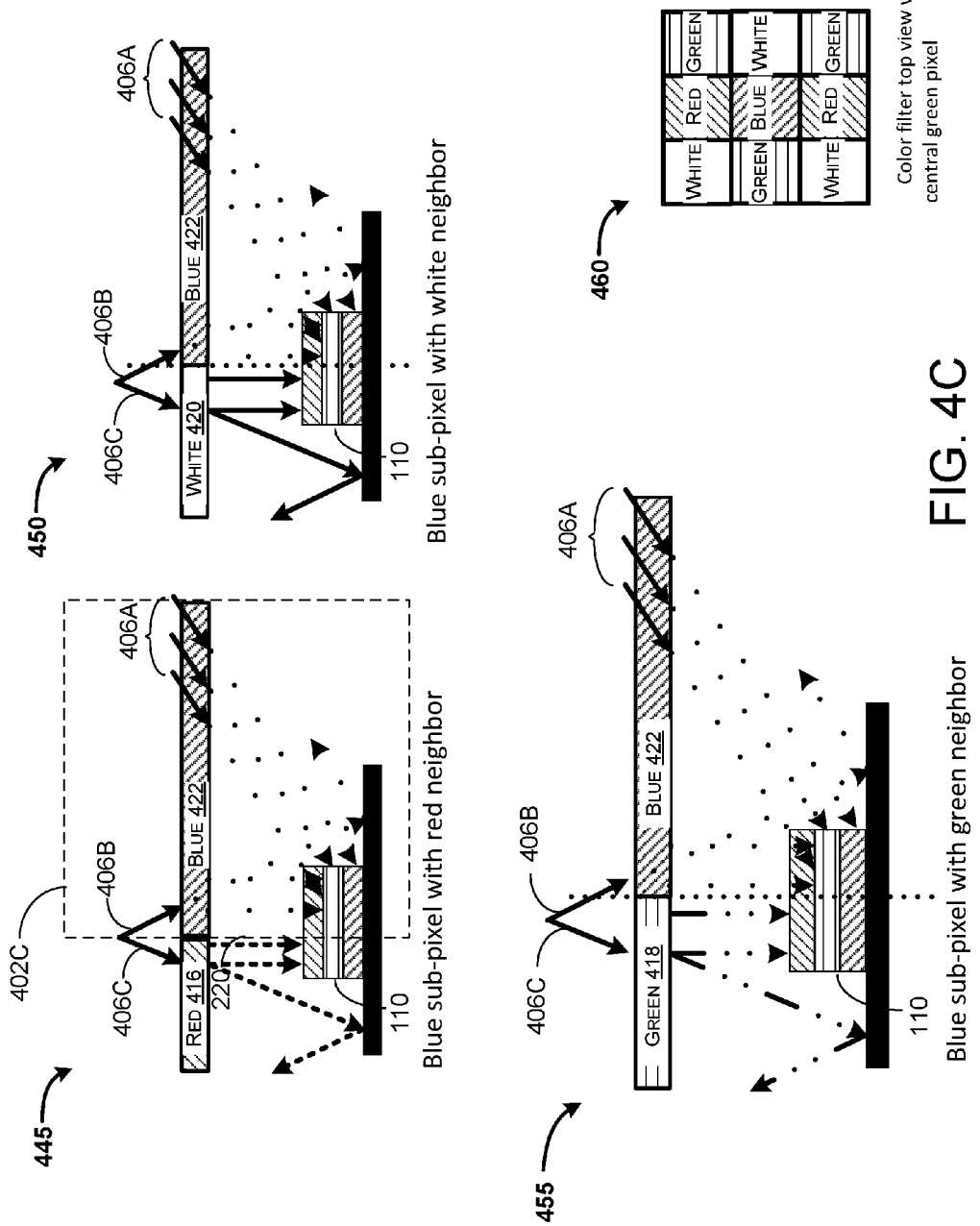

FIG. 4C shows a central blue sub-pixel with a red neighbor, a white neighbor, and a green neighbor. Referring now to element 445, a blue pixel region (as indicated by dashed line 402C) includes pixel wall 110 that has three layers (e.g., red, green, blue) arranged as a brick type pixel wall. The neighboring pixel region left of the blue pixel region is a red pixel region. Pixel region 402C includes a blue color filter 422, and the neighboring pixel region left of pixel region 402C includes a red color filter 416. Element 460 shows a top view of an arrangement of color filters over pixel regions that include a central blue pixel.

In the examples illustrated in FIG. 4C, light rays 406A and 406B represent white light impinging upon blue pixel region 402C at different angles of incidence. Subsequent to transmission through the blue color filter 422, the resulting light rays (as indicated by dotted lines to indicate blue light) comprise blue light without red and green light (the red and green colors of the original light rays 406A and 406B having been absorbed and/or reflected). Blue light rays can transmit through a blue pixel wall layer in pixel wall 110, but may not penetrate into or transmit through the other pixel wall layers of different colors. Thus, a blue light ray is at least partially absorbed by a green pixel wall layer and/or a red pixel wall layer. The blue light ray resulting from the transmission of light ray 406B through the blue color filter 422 is at least partially reflected from a reflecting portion of an electrowetting display.

Light ray 406C represents white light impinging upon red pixel regions at different angles of incidence. Subsequent to transmission through the red color filter 416, the resulting light rays (as indicated by dashed lines to indicate red light) comprise red light without green and blue light (the green and blue colors of the original light ray 406C having been absorbed and/or reflected). Red light rays can transmit through a red pixel wall layer in pixel wall 110, but may not penetrate into or transmit through the other pixel wall layers of different colors.

In another example, the blue pixel region 402C is adjacent to a white pixel region as indicated by element 450. The transmission, absorption and reflection of the light rays 406 is similar to the transmission, absorption and reflection as illustrated by element 445. In the example illustrated by element 450, the blue light is absorbed by the pixel wall 110 and/or reflected. In yet another example, the blue pixel region is adjacent to a green pixel region as indicated by element 455. The transmission, absorption and reflection of the light rays 406 is similar to the transmission, absorption and reflection as illustrated by element 445.

Figure 4D:
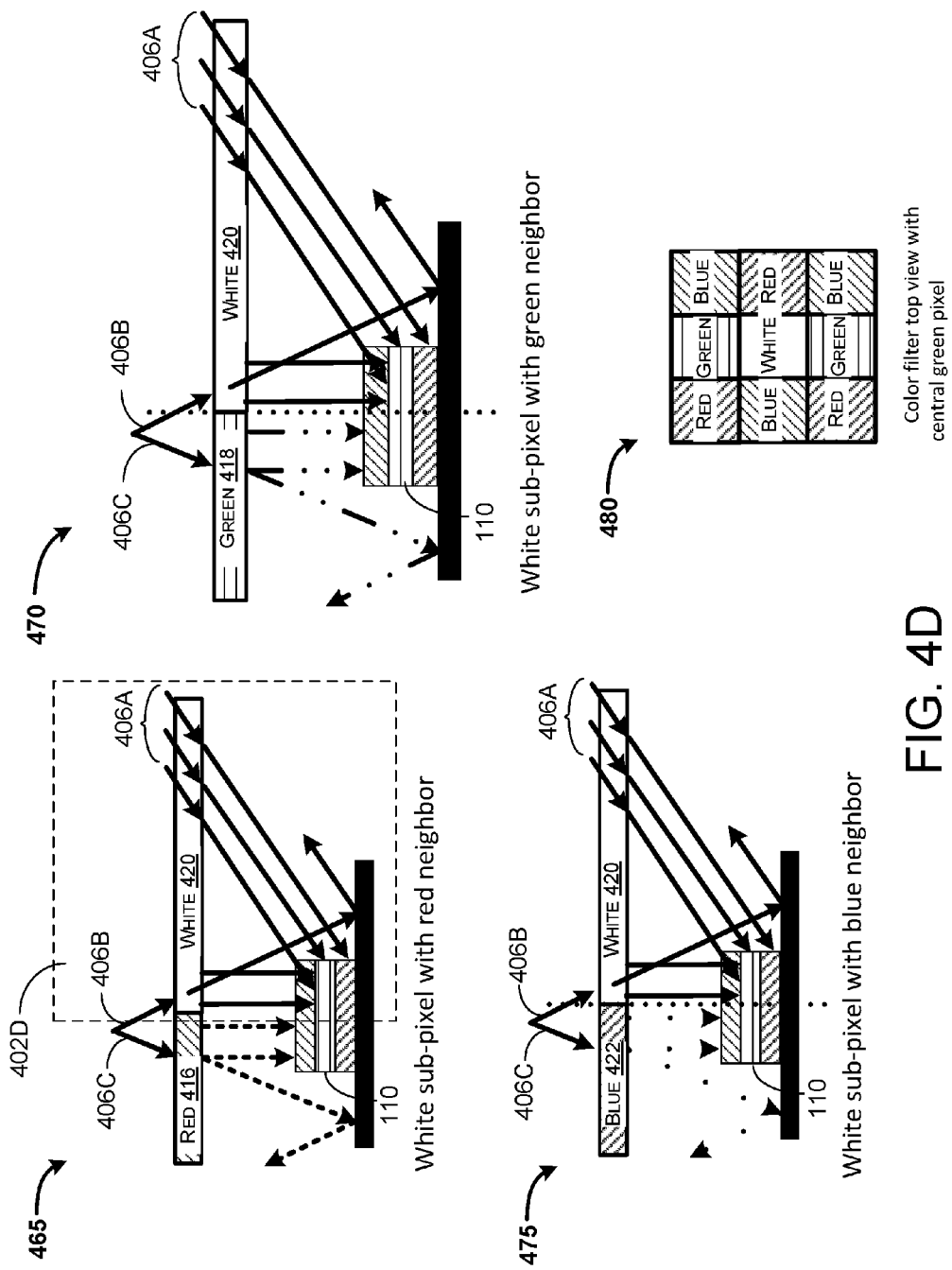

FIG. 4D shows a central white sub-pixel with a red neighbor, a green neighbor, and a blue neighbor. Referring now to element 465, a white pixel region (as indicated by dashed line 402D) includes pixel wall 110 that has three layers (e.g., red, green, blue) arranged as a brick type pixel wall. The neighboring pixel region left of the white pixel region is a red pixel region. Pixel region 402D includes a white color filter 420, and the neighboring pixel region left of pixel region 402C includes a red color filter 416. Element 480 shows a top view of an arrangement of color filters over pixel regions that include a central white pixel. For sake of explanation, a particular example is considered where the colors include red, green, blue, and white.

In the examples illustrated in FIG. 4D, light rays 406A and 406B represent white light impinging upon white pixel region 402D at different angles of incidence. Subsequent to transmission through the white color filter 422, the resulting light rays (as indicated by dotted lines to indicate blue light) comprise white light. White light rays may not penetrate into or transmit through the other pixel wall layers of different colors. Thus, a white light ray is at least partially absorbed by a green pixel wall layer, a blue pixel wall layer, and/or a red pixel wall layer. The white light ray resulting from the transmission of light ray 406B through the white color filter 422 is at least partially reflected from a reflecting portion of an electrowetting display.

Light ray 406C represents white light impinging upon red pixel regions at different angles of incidence. Subsequent to transmission through the red color filter 416, the resulting light rays (as indicated by dashed lines to indicate red light) comprise red light without green and blue light (the green and blue colors of the original light ray 406C having been absorbed and/or reflected). Red light rays can transmit through a red pixel wall layer in pixel wall 110, but may not penetrate into or transmit through the other pixel wall layers of different colors.

In another example, the white pixel region 402D is adjacent to a green pixel region as indicated by element 470. The transmission, absorption and reflection of the light rays 406 is similar to the transmission, absorption and reflection as illustrated by element 465. In the example illustrated by element 470, the white light is absorbed by the pixel wall 110 and/or reflected. In yet another example, the white pixel region is adjacent to a blue pixel region as indicated by element 475. The transmission, absorption and reflection of the light rays 406 is similar to the transmission, absorption and reflection as illustrated by element 465.

Figure 5A:
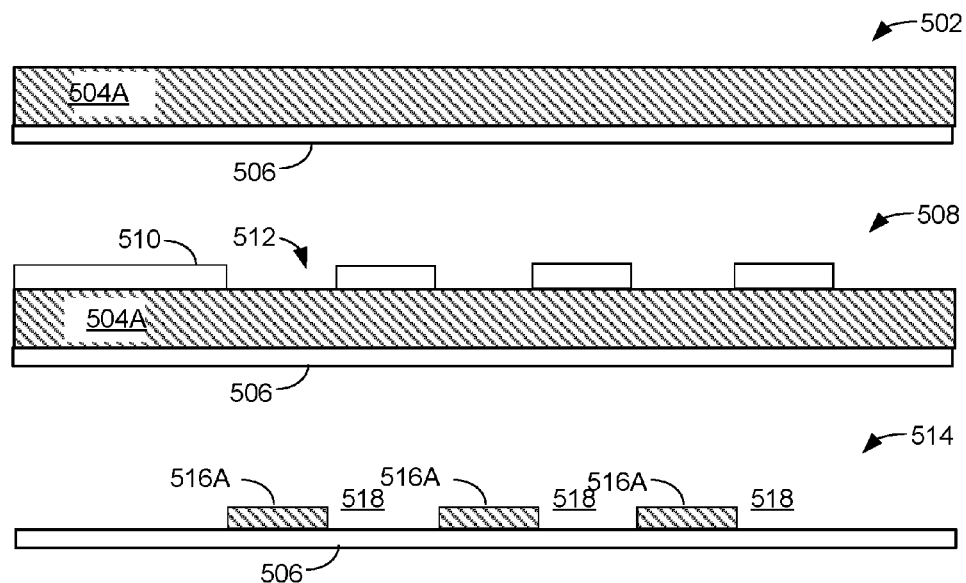
FIGS. 5A, 5B, and 5C are cross-section views of a process for forming brick type pixel walls, according to some examples.
Figure 5B:
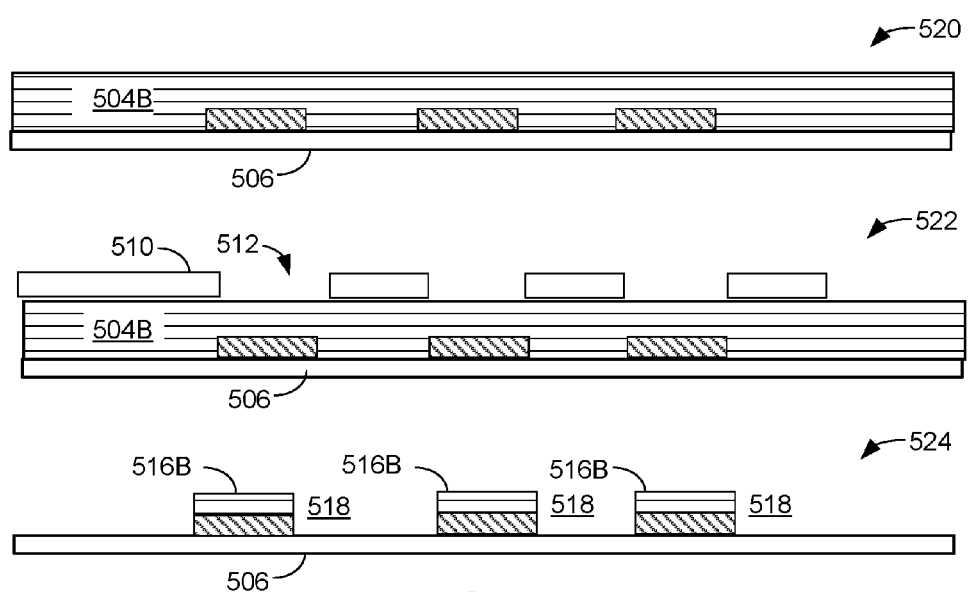
Figure 5C:
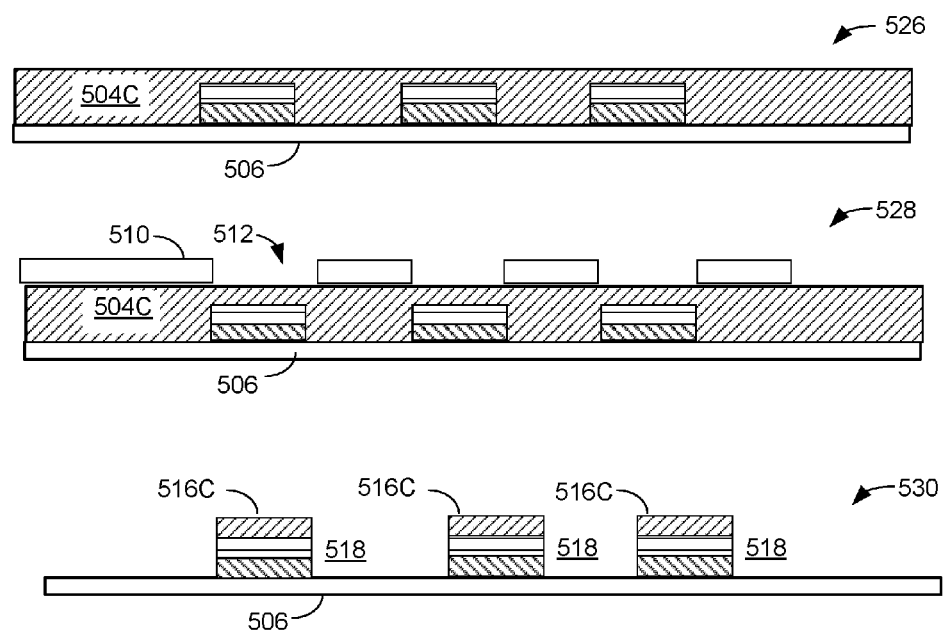

FIGS. 5A-5C show cross-section views of processes for forming brick type pixel walls for an electrowetting display, according to some examples. For example, such processes may be part of fabricating an array of colored pixels that each have a brick type pixel wall (e.g., such as pixel regions in array 300). Such processes may be performed by a fabricator, such as a person, an apparatus, a person operating an apparatus, or a combination thereof, for example.

FIG. 5A shows a cross-section view of a process for forming a first colored layer of a pixel wall 110. In process 502, a fabricator may apply e.g., deposit pixel wall material 504 having a first color (e.g., blue) on a support plate 506. In some examples, pixel wall material 504 may be a colored photoresist material, which may comprise a negative tone photoresist made by diffusing pigments in a UV-curing resin, such as an acryl-epoxy resin, and by dissolving the resin in a solvent, for example. Photoresist may comprise SU8 photoresist, just to name an example. Pixel wall material 504 may be applied on the support plate by coating techniques, such as spin coating or slit coating.

In process 508, the fabricator may place an etching barrier 510 (e.g., a mask) on pixel wall material 504 by any of a number of techniques, such as spin coating or slit coating, and so on. Alignment keys (not illustrated) may be placed outside the display area of the electrowetting display, relatively close to edges of support plate 506. The alignment keys may be used to place etching barrier 510 with respect to pixel regions that will be partly defined by pixel walls disposed on the support plate, as described below.

Etching barrier 510 may comprise a photoresist, such as SU8 photoresist, just to name an example. Etching barrier 510 may be patterned to include openings 512 that correspond to the brick type pixel walls to be subsequently formed. The etching barrier is used in a process of photolithography where patterns of the etching barrier guide removal of pixel wall material 504 from support plate 506. For example, openings 512 expose portions of pixel wall material 504 to EM energy (e.g., visible and/or UV) that alters properties of the pixel wall material so that the pixel wall material is relatively resistant to a subsequent chemical etch at the exposed regions. After such EM energy exposure and removal of etching barrier 510, non-exposed pixel wall material may be removed by a wet-chemical etch or a dry etching technique, for example, or other suitable removal process.

Accordingly, at process 514, non-exposed pixel wall material 504 is removed while the pixel wall material in areas corresponding to openings 512 remains and forms pixel walls 516 having the first color. Each region 518 surrounded by pixel walls 516 corresponds to a pixel region of the first color.

FIG. 5B is a cross-section view of a process for forming a second layer of a brick type pixel wall for the electrowetting display, according to some examples. In process 520, a fabricator may deposit pixel wall material 504B having a second color (e.g., green) on support plate 506. In some examples, pixel wall material 504B may be a colored photoresist material similar to pixel wall material 504A described above, for example. Pixel wall material 504B may be applied on the support plate by coating techniques, such as spin coating or slit coating, and so on. Pixel wall material 504B may be applied on the support plate to a thickness substantially the same as the layer height of the pixel layer formed by the process described by FIG. 5A. Pixel wall material 504B may be applied to fill in spaces among pixel walls 516.

In process 522, the fabricator may place an etching barrier 510 (e.g., mask) on pixel wall material 504B by any of a number of techniques, such as spin coating or slit coating, and so on. According to some configurations, the etching barrier 510 (e.g., the mask) is the same as the etching barrier used in the process described with regard to FIG. 5A.

At process 524, non-exposed pixel wall material 504B is removed while the pixel wall material in areas corresponding to openings 512 remains and forms the second layer 516B of the brick type pixel wall having a second color.

FIG. 5C is a cross-section view of a process for forming a third layer of a brick type pixel wall for the electrowetting display, according to some examples. In process 526, a fabricator may deposit pixel wall material 504C having a third color (e.g., red) on support plate 506. In some examples, pixel wall material 504C may be a colored photoresist material similar to pixel wall material 504A and/or 504B described above, for example. Pixel wall material 504C may be applied on the support plate by coating techniques, such as spin coating or slit coating, and so on. Pixel wall material 504C may be applied on the support plate to a thickness substantially the same as the layer height of the pixel layer formed by the process described by FIG. 5A or FIG. 5B. Pixel wall material 504C may be applied to fill in spaces among pixel walls 516.

In process 528, the fabricator may place an etching barrier 510 (e.g., mask) on pixel wall material 504C by any of a number of techniques, such as spin coating or slit coating, and so on. Etching barrier 510 may be patterned to include openings 512 that correspond to the brick type pixel walls to be subsequently formed. The etching barrier 510 can be the same etching barrier used in processes 508 and 522 as described above.

At process 530, non-exposed pixel wall material 504C is removed while the pixel wall material in areas corresponding to openings 512 remains and forms the third layer 516C of the brick type pixel wall having a second color. The different layers 516A, 516B, and 516C form the brick type pixel wall 110.

Figure 6:
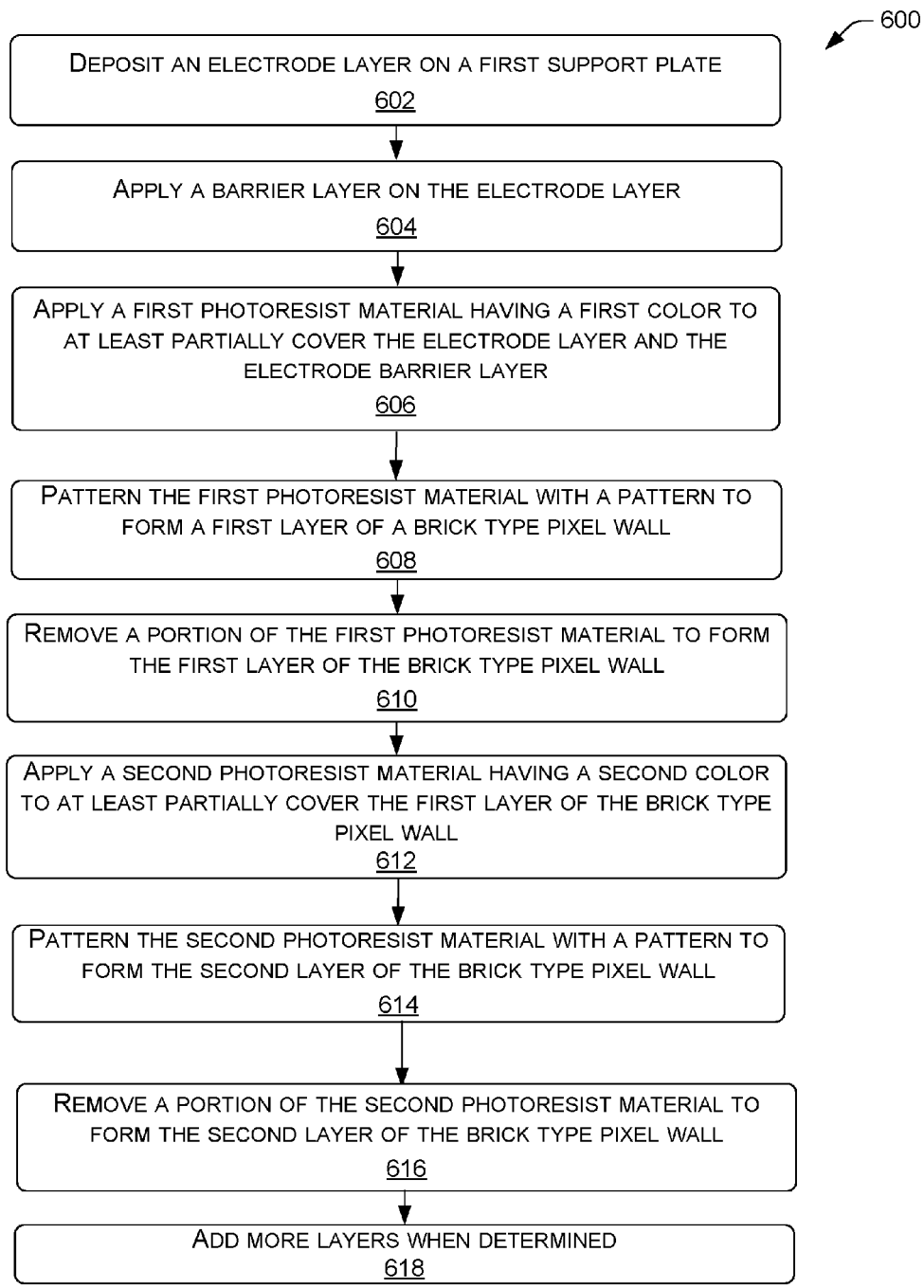
FIG. 6 is a flow diagram of a process for fabricating an electrowetting display device, according to various examples.

FIG. 6 is a flow diagram of a process 600 for fabricating an electrowetting display device, according to various examples. For example, the display device may be the same as or similar to the display device illustrated in FIG. 1. Though claimed subject matter is not limited in this respect, process 600 may be performed by a fabricator, such as a person, an apparatus, a person operating an apparatus, or a combination thereof, for example.

At 602, a fabricator may apply, e.g., deposit an electrode layer on a first support plate. For example, such an electrode layer may be the same as or similar to 216 and first support plate may the same as or similar to 214, illustrated in FIG. 2. Application may be performed by CVD, PVD, MBE, or sputtering, just to name a few examples.

At 604, the fabricator may apply e.g., deposit a barrier layer on the electrode layer. The barrier layer, which may be the same as or similar to 218 illustrated in FIG. 2, may comprise an inorganic and/or organic dielectric material.

At 606, the fabricator may apply a first photoresist material having a first color to at least partially cover the electrode layer and the electrode barrier layer. In some examples, first photoresist material may be a colored photoresist material, which may comprise a negative tone photoresist made by diffusing pigments in a UV-curing resin, such as an acryl-epoxy resin, and by dissolving the resin in a solvent, for example. Photoresist may comprise SU8 or a JSR photoresist, just to name a few examples. First photoresist material may be applied on the support plate by coating techniques, such as spin coating or slit coating, and so on.

At 608, the fabricator may pattern the first photoresist material with a pattern for forming a first layer of brick type pixel walls, as described above in process 502 of FIG. 5A, for example.

At 610, the fabricator may remove a portion of the first photoresist material to form the first layer of the brick type pixel walls, as described above in process 514 of FIG. 5A, for example.

At 612, the fabricator may apply a second photoresist material having a second color to at least partially cover the first layer of the brick type pixel walls, the electrode layer and the electrode barrier layer. In some examples, second photoresist material may be a colored photoresist material, which may comprise a negative tone photoresist made by diffusing dyes or pigments in a UV-curing resin, such as an acryl-epoxy resin, and by dissolving the resin in a solvent, for example. Photoresist may comprise SU8 or a JSR photoresist, just to name a few examples. Second photoresist material may be applied on the support plate by coating techniques, such as spin coating or slit coating, and so on.

At 614, the fabricator may pattern the second photoresist material with a pattern for forming the second layer of the brick type pixel walls, as described above in process 520 of FIG. 5B, for example.

At 616, the fabricator may remove a portion of the second photoresist material to form the second layer of the brick type pixel walls, as described above in process 524 of FIG. 5B, for example.

At 618, one or more additional layers may be added to the already deposited first and second layers of the brick type pixel wall. For example, the process as described with regard to FIG. 5C can be used to add a third layer to the brick type pixel wall. Subsequently, the brick type pixel walls include two or more layers of different colors and delineate pixel regions, on the first support plate.

Figure 7:
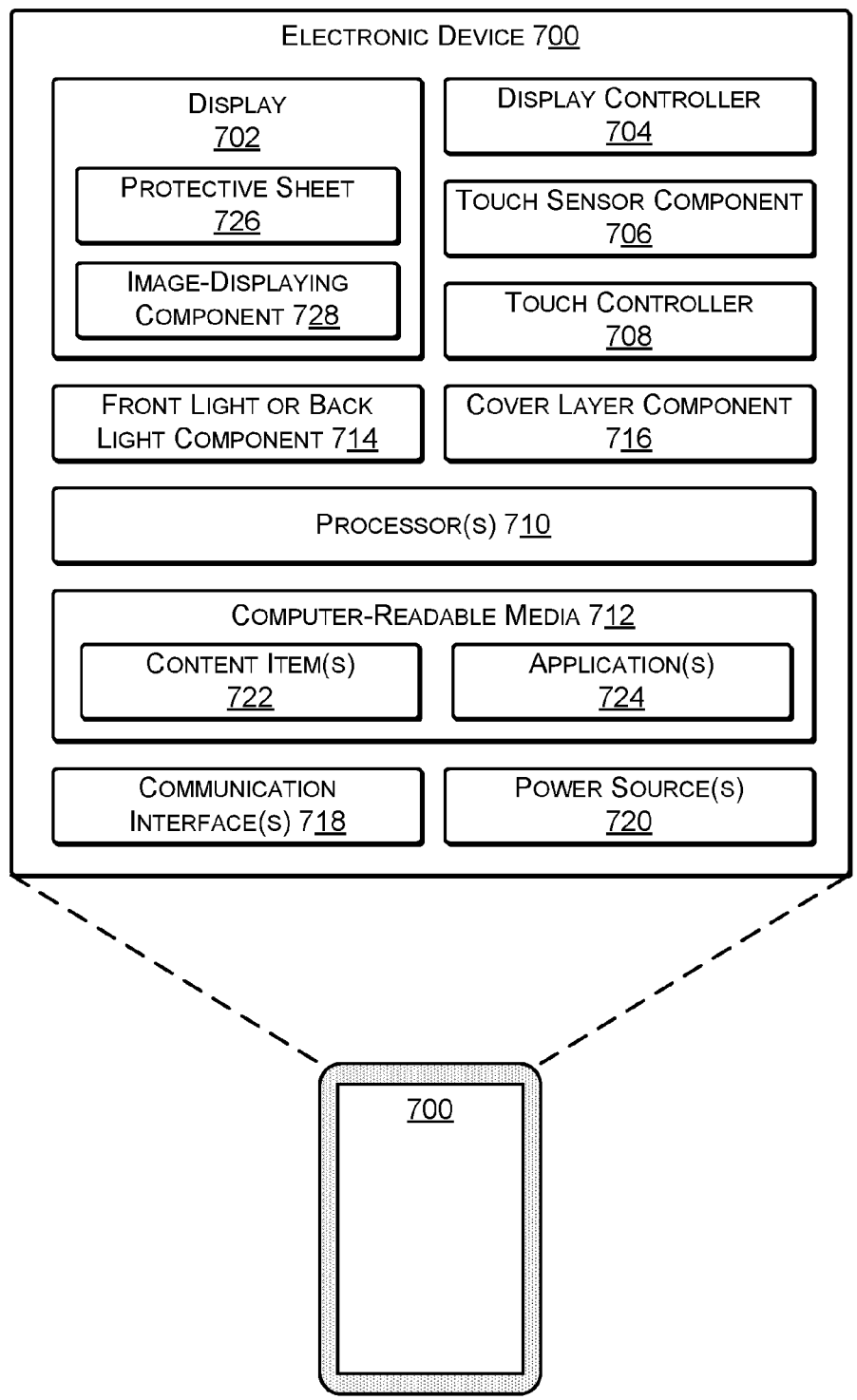
FIG. 7 illustrates an example electronic device that may incorporate a display device, according to some examples.

FIG. 7 illustrates an example electronic device 700 that may incorporate any of the display devices discussed above. The device 700 may comprise any type of electronic device having a display. For instance, the device 700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 700 may be a non-mobile electronic device (e.g., a computer display, a television, etc.). In addition, while FIG. 7 illustrates several example components of the electronic device 700, it is to be appreciated that the device 700 may also include other conventional components, such as an operating system, system busses, input/output components, and the like. Further, in other examples, such as in the case of a television or computer monitor, the electronic device 700 may only include a subset of the components illustrated.

Regardless of the specific implementation of the electronic device 700, the device 700 includes a display 702 and a corresponding display controller 704. The display 702 may represent a reflective or transmissive display in some instances.

In an implementation, the display comprises an electrowetting display that employs an applied voltage to change the surface tension of a fluid in relation to a surface. For example, such an electrowetting display may include the array of pixels 300 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples are described in the environment of a reflective display, in other examples, the display 702 may represent a backlit display, examples of which are mentioned above.

In addition to including the display 702, FIG. 7 illustrates that some examples of the device 700 may include a touch sensor component 706 and a touch controller 708. In some instances, at least one touch sensor component 706 resides with, or is stacked on, the display 702 to form a touch-sensitive display. Thus, the display 702 may be capable of both accepting user touch input and rendering content in response to or corresponding to the touch input. As several examples, the touch sensor component 706 may comprise a capacitive touch sensor, a force sensitive resistance (FSR), an interpolating force sensitive resistance (IFSR) sensor, or any other type of touch sensor. In some instances, the touch sensor component 706 is capable of detecting touches as well as determining an amount of pressure or force of these touches.

FIG. 7 further illustrates that the electronic device 700 may include one or more processors 710 and one or more computer-readable media 712, as well as a front light component 714 (which may alternatively be a backlight component in the case of a backlit display) for lighting the display 702, a cover layer component 716, such as a cover glass or cover sheet, one or more communication interfaces 718 and one or more power sources 720. The communication interfaces 718 may support both wired and wireless connection to various networks, such as cellular networks, radio, WiFi networks, short range networks (e.g., Bluetooth®), infrared (IR), and so forth.

Depending on the configuration of the electronic device 700, the computer-readable media 712 (and other computer-readable media described throughout) is an example of computer storage media and may include volatile and non-volatile memory. Thus, the computer-readable media 712 may include, but is not limited to, RAM, ROM, EEPROM, flash memory, or other memory technology, or any other medium that may be used to store computer-readable instructions, programs, applications, media items, and/or data which may be accessed by the electronic device 700.

The computer-readable media 712 may be used to store any number of functional components that are executable on the processor 710, as well as content items 722 and applications 724. Thus, the computer-readable media 712 may include an operating system and a storage database to store one or more content items 722, such as eBooks, audio books, songs, videos, still images, and the like. The computer-readable media 712 of the electronic device 700 may also store one or more content presentation applications to render content items on the device 700. These content presentation applications may be implemented as various applications 724 depending upon the content items 722. For instance, the content presentation application may be an electronic book reader application for rending textual electronic books, an audio player for playing audio books or songs, a video player for playing video, and so forth.

In some instances, the electronic device 700 may couple to a cover (not illustrated in FIG. 7) to protect the display (and other components in the display stack or display assembly) of the device 700. In one example, the cover may include a back flap that covers a back portion of the device 700 and a front flap that covers the display 702 and the other components in the stack. The device 700 and/or the cover may include a sensor (e.g., a Hall effect sensor) to detect if the cover is open (i.e., if the front flap is not atop the display and other components). The sensor may send a signal to the front light component 714 if the cover is open and, in response, the front light component 714 may illuminate the display 702. If the cover is closed, meanwhile, the front light component 714 may receive a signal indicating that the cover has closed and, in response, the front light component 714 may turn off.

Furthermore, the amount of light emitted by the front light component 714 may vary. For instance, upon a user opening the cover, the light from the front light may gradually increase to its full illumination. In some instances, the device 700 includes an ambient light sensor (not illustrated in FIG. 7) and the amount of illumination of the front light component 714 may be based at least in part on the amount of ambient light detected by the ambient light sensor. For example, the front light component 714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 702 may vary depending on whether the front light component 714 is on or off, or based on the amount of light provided by the front light component 714. For instance, the electronic device 700 may implement a larger default font or a greater contrast if the light is off compared to if the light is on. In some instances, the electronic device 700 maintains, if the light is on, a contrast ratio for the display that is within a certain defined percentage of the contrast ratio if the light is off.

As described above, the touch sensor component 706 may comprise a capacitive touch sensor that resides atop the display 702. In some examples, the touch sensor component 706 may be formed on or integrated with the cover layer component 716. In other examples, the touch sensor component 706 may be a separate component in the stack of the display assembly. The front light component 714 may reside atop or below the touch sensor component 706. In some instances, either the touch sensor component 706 or the front light component 714 is coupled to a top surface of a protective sheet 726 of the display 702. As one example, the front light component 714 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards the display 702, thus illuminating the display 702.

The cover layer component 716 may include a transparent substrate or sheet having an outer layer that functions to reduce at least one of glare or reflection of ambient light incident on the electronic device 700. In some instances, the cover layer component 716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 726 may include a similar UV-cured hard coating on the outer surface. The cover layer component 716 may couple to another component or to the protective sheet 726 of the display 702. The cover layer component 716 may, in some instances, also include a UV filter, a UV-absorbing dye, or the like, for protecting components lower in the stack from UV light incident on the electronic device 700. In still other examples, the cover layer component 716 may include a sheet of high-strength glass having an antiglare and/or antireflective coating.

The display 702 includes the protective sheet 726 overlying an image-displaying component 728. For example, the display 702 may be preassembled to have the protective sheet 726 as an outer surface on the upper or image-viewing side of the display 702. Accordingly, the protective sheet 726 may be integral with and may overlay the image-displaying component 728. The protective sheet 726 may be optically transparent to enable a user to view, through the protective sheet 726, an image presented on the image-displaying component 728 of the display 702.

In some examples, the protective sheet 726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 726 may include a coating, such as the hard coating described above. For instance, the hard coating may be applied to the outer surface of the protective sheet 726 before or after assembly of the protective sheet 726 with the image-displaying component 728 of the display 702. In some examples, the hard coating may include a photoinitiator or other reactive species in its composition, such as for curing the hard coating on the protective sheet 726. Furthermore, in some examples, the protective sheet 726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 726, thereby protecting the image-displaying component 728 from UV light.

According to some implementations herein, one or more of the components discussed above may be coupled to the display 702 using fluid optically-clear adhesive (LOCA). For example, suppose that the light guide portion of the front light component 714 is to be coupled to the display 702. The light guide may be coupled to the display 702 by placing the LOCA on the outer or upper surface of the protective sheet 726. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 714. In other implementations, the LOCA may be placed near a center of the protective sheet 726, and pressed outwards towards a perimeter of the top surface of the protective sheet 726 by placing the front light component 714 on top of the LOCA. The LOCA may then be cured by directing UV light through the front light component 714. As discussed above, and as discussed additionally below, various techniques, such as surface treatment of the protective sheet, may be used to prevent discoloration of the LOCA and/or the protective sheet 726.

While FIG. 7 illustrates a few example components, the electronic device 700 may have additional features or functionality. For example, the device 700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 700 may reside remotely from the device 700 in some implementations. In these implementations, the device 700 may utilize the communication interfaces 718 to communicate with and utilize this functionality.

As illustrated, a display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, comprise a subpixel or pixel that includes two or more subpixels of an electrowetting display device. Such a pixel or subpixel may be the smallest light transmissive, reflective or transflective pixel of a display that is individually operable to directly control an amount of light transmission through or reflection from the pixel. For example, in some implementations, a pixel may comprise a red subpixel, a green subpixel, and a blue subpixel. In other implementations, a pixel may be a smallest component, e.g., the pixel does not include any subpixels.

Example examples include, but are not limited to, reflective electrowetting displays that include a clear top support plate and a bottom support plate, which need not be transparent. The clear top support plate may comprise glass or any of a number of transparent materials and may be made of a rigid or flexible material, such as plastic (e.g., a transparent thermoplastic such as PMMA or other acrylic), quartz, semiconductors, and so on, and claimed subject matter is not limited in this respect. "Top" and "bottom", as used to identify the support plates of an electrowetting display, do not necessarily refer to a direction referenced to gravity or to a viewing side of the electrowetting display. Also, as used for sake of convenience of describing example examples, the top support plate is that through which viewing of pixels of a (reflective) electrowetting display occurs.

In some examples, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light impinging on its surface, though claimed subject matter is not limited in this respect.

Pixel walls, which may be brick type pixel walls, retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting pixels may include a reflective layer on the bottom support plate of the electrowetting pixel, a transparent electrode layer adjacent to the reflective layer, and a hydrophobic fluoropolymer (AF) layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting pixels, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which should be similar to or the same as the refractive indices of surrounding media. Spacers are also desirably chemically inert to surrounding media.

In some examples, a display device as described may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all examples falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

It will be understood that when an element or layer is referred to as being "on", "over", or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present.

Reference throughout this specification to "one example" or "an example" may mean that a particular feature, structure, or characteristic described in connection with a particular example may be included in at least one example of claimed subject matter. Thus, appearances of the phrase "in one example" or "an example" in various places throughout this specification are not necessarily intended to refer to the same example or to any one particular example described. Furthermore, it is to be understood that particular features, structures, or characteristics described may be combined in various ways in one or more examples. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a bottom support plate;
   a top support plate positioned above the bottom support plate and substantially parallel to the bottom support plate, wherein a space between the bottom support plate and the top support plate comprises a plurality of pixel regions for presenting content on the electrowetting display device;
   a first pixel region of the plurality of pixel regions surrounded by a pixel wall, wherein the pixel wall comprises a first layer of a first color, a second layer of a second color disposed over and in contact with the first layer, and a third layer of a third color disposed over and in contact with the second layer;
   a first color filter disposed above the pixel wall and extending at least over a first portion of the pixel wall; and
   a second color filter disposed adjacent to the first color filter and extending over a second portion of the pixel wall.

2. The electrowetting display device of claim 1, wherein the first layer of the pixel wall comprises a first photoresist material comprising a first pigment having the first color, the second layer of the pixel wall comprises a second photoresist material comprising a second pigment having the second color, and the third layer of the pixel wall comprises a third photoresist material comprising a third pigment having the third color.

3. The electrowetting display device of claim 1, wherein the first color filter overlays the first pixel region of the plurality of pixel regions and is of the first color, the second color filter overlays a second pixel region of the plurality of pixel regions and is of the second color, and the electrowetting display device comprises a third color filter overlaying a third pixel region of the plurality of pixel regions, the third color filter being of the third color.

4. The electrowetting display device of claim 1, wherein either:
   the first color comprises red and the second color comprises green or blue; or
   the first color comprises green and the second color comprises red or blue; or
   the first color comprises blue and the second color comprises green or red.

5. An electrowetting display device comprising:
   a bottom support plate;
   a top support plate positioned above the bottom support plate and substantially parallel to the bottom support plate, wherein a space between the bottom support plate and the top support plate comprises a first pixel region comprising:
      a pixel electrode disposed on the bottom support plate;
      a hydrophobic layer portion disposed on the pixel electrode;
      an electrowetting oil disposed on the hydrophobic layer portion; and
      an electrolyte solution at least partially surrounding the electrowetting oil; and
   a pixel wall comprising a first layer of a first color and a second layer of a second color disposed on the first layer, the second color being different from the first color, wherein the pixel wall borders at least a portion of the first pixel region.

6. The electrowetting display device of claim 5, wherein the first color is associated with the first pixel region and the second color is associated with a second pixel region.

7. The electrowetting display device of claim 5, wherein the first layer of the pixel wall comprises a first photoresist material comprising a first pigment having the first color and the second layer of the pixel wall comprises a second photoresist material comprising is a second pigment having the second color.

8. The electrowetting display device of claim 5, further comprising a first color filter of the first color disposed above the first pixel region and a second color filter of the second color disposed above a second pixel region.

9. The electrowetting display device according to claim 5, wherein the second layer is disposed over and in contact with the first layer.

10. The electrowetting display device of claim 5, further comprising a first color filter of the first color at least partially overlaying the pixel wall and a second color filter of the second color at least partially overlaying the pixel wall.

11. The electrowetting display device of claim 10, wherein the first color filter is adjacent to and in contact with the second color filter.

12. The electrowetting display device of claim 5, wherein the electrowetting oil of the first pixel region is a first portion of the electrowetting oil and the pixel wall at least partially contains the first portion of the electrowetting oil within the first pixel region and at least partially contains a second portion of the electrowetting oil within a second pixel region adjacent to the first pixel region.

13. The electrowetting display device of claim 5, wherein either:
   the first color comprises red and the second color comprises green or blue; or
   the first color comprises green and the second color comprises red or blue; or
   the first color comprises blue and the second color comprises green or red.

14. The electrowetting display device of claim 13, wherein the first material and the second material each comprise a photoresist comprising diffused pigments in a UV-curing resin.

15. A method for fabricating at least a portion of an electrowetting display device, the method comprising:
   depositing an electrode layer on a first support plate;
   forming a barrier layer on the electrode layer;
   applying a first photoresist material of a first color to at least partially cover the electrode layer and the barrier layer;
   patterning the first photoresist material with a pattern;
   removing a portion of the first photoresist material to form a first layer of a first set of pixel walls;
   applying a second photoresist material of a second color to at least partially cover the first layer, wherein the second color is different from the first color;
   patterning the second photoresist material; and
   removing a portion of the second photoresist material to form a second layer of the first set of pixel walls, wherein the first set of pixel walls delineate pixel regions on the first support plate.

16. The method of claim 15, further comprising:
   placing or forming a first color filter of the first color to at least partially overlay a first pixel wall of the first set of the pixel walls; and
   placing or forming a second color filter of the second color to at least partially overlay the first pixel wall, wherein the first color filter is adjacent to and in contact with the second color filter.

17. The method of claim 15, wherein:
the first color comprises red and the second color comprises green or blue; or
the first color comprises green and the second color comprises red or blue; or
the first color comprises blue and the second color comprises green or red.

18. The method of claim 15, comprising, before the applying the first photoresist material and before the applying the second photoresist material, applying a hydrophobic layer on the barrier layer in the pixel regions.

19. The method of claim 15, further comprising diffusing one or more pigments in the first photoresist material to form the first photoresist material of the first color and diffusing one or more pigments in the second photoresist material to form the second photoresist material of the second color.

20. The method of claim 15, wherein the first layer is about the same thickness as the second layer.

\* \* \* \* \*

UNITED STATES PATENT AND TRADEMARK OFFICE
CERTIFICATE OF CORRECTION

PATENT NO.        : 10,001,639 B1
APPLICATION NO.   : 15/067258
DATED             : June 19, 2018
INVENTOR(S)       : Guntaka et al.

Page 1 of 1

It is certified that error appears in the above-identified patent and that said Letters Patent is hereby corrected as shown below:

In Column 20, Line 5, in Claim 7, delete "comprising is a" and insert -- comprising a --, therefor.

Signed and Sealed this
Twenty-third Day of April, 2019

Andrei Iancu
*Director of the United States Patent and Trademark Office*